(12) United States Patent
Tachihara et al.

(10) Patent No.: US 9,065,368 B2
(45) Date of Patent: Jun. 23, 2015

(54) CONTROL METHOD FOR INDUCTION MOTOR

(71) Applicant: HITACHI, LTD., Tokyo (JP)

(72) Inventors: Shuichi Tachihara, Hitachinaka (JP); Tetsuo Kojima, Hitachinaka (JP); Toyoki Asada, Hitachinaka (JP); Yongqiang Xia, Mito (JP)

(73) Assignee: HITACHI, LTD., Tokyo (JP)

( * ) Notice: Subject to any disclaimer, the term of this patent is extended or adjusted under 35 U.S.C. 154(b) by 207 days.

(21) Appl. No.: 13/765,873

(22) Filed: Feb. 13, 2013

(65) Prior Publication Data

US 2013/0257343 A1    Oct. 3, 2013

(30) Foreign Application Priority Data

Mar. 29, 2012  (JP) .................................. 2012-075736

(51) Int. Cl.
*H02P 21/00* (2006.01)
*H02P 3/18* (2006.01)
*H02P 27/06* (2006.01)

(52) U.S. Cl.
CPC . *H02P 3/18* (2013.01); *H02P 27/06* (2013.01)

(58) Field of Classification Search
USPC ............ 318/805, 806, 727, 825, 156.01, 432; 363/96, 37, 25, 126, 127
See application file for complete search history.

(56) References Cited

U.S. PATENT DOCUMENTS

| 7,187,155 B2 * | 3/2007 | Matsuo et al. ............ 318/400.04 |
| 2009/0261774 A1 * | 10/2009 | Yuuki et al. ................... 318/720 |

FOREIGN PATENT DOCUMENTS

| JP | 09-065689 | | 3/1997 |
| JP | 10-66386 | | 3/1998 |
| JP | 2003-230293 | | 8/2003 |
| JP | 2008-113501 | | 5/2008 |
| JP | 2008113501 A | * | 5/2008 |
| JP | 2009-072006 | | 4/2009 |
| JP | 2009072006 A | * | 4/2009 |
| JP | 2009-100633 | | 5/2009 |
| JP | 2009100633 A | * | 5/2009 |

OTHER PUBLICATIONS

Office Action in corresponding Japanese Patent Application No. 2012-075736, mailed Apr. 15, 2014.
Office Action in corresponding Korean Patent Application No. 10-2013-0017360, mailed Feb. 28, 2014.

* cited by examiner

*Primary Examiner* — Kawing Chan
*Assistant Examiner* — Jorge L Carrasquillo
(74) *Attorney, Agent, or Firm* — Baker Botts L.L.P.

(57) ABSTRACT

In order to cause the residual magnetic flux in an induction motor to decay in a short time without an excessive current flow, an induction motor control apparatus continues an operation in which an inverter apparatus is caused to output a zero voltage to the induction motor for a predetermined time before deactivating an operation of the inverter apparatus.

11 Claims, 3 Drawing Sheets

T2 = Approximately Lm' / R2' × 3

T2 = Approximately Lm' / R2' × 3

Tσ = Approximately Lσ / Rσ × 3

CONTROL METHOD FOR INDUCTION MOTOR

BACKGROUND

1. Technical Field

The present disclosure relates generally to an apparatus for driving an induction motor.

2. Related Art

As a motor drive system for industrial applications, a system by which an induction motor or a synchronous motor is variable-speed driven by using an inverter apparatus is widely used. For example, in railway vehicles, generally one to four induction motors are driven by a single inverter apparatus.

A railway vehicle typically accelerates from a deactivated state by starting the inverter apparatus, transitions to a coasting state in which the vehicle runs through inertia while the inverter apparatus is deactivated, and then accelerates or decelerates from the coasting state by restarting the inverter apparatus.

In the coasting state, the inverter apparatus is deactivated, so that no voltage is applied from the inverter apparatus to the induction motor. In principle, however, the magnetic flux in the induction motor does not disappear immediately but remains after the inverter apparatus is deactivated. The magnetic flux that remains in the induction motor when the inverter apparatus is deactivated is referred to as "the residual magnetic flux". When there is the residual magnetic flux, an induced voltage proportional to the product of the residual magnetic flux and the rotation speed is produced in the induction motor.

In the state in which the inverter apparatus is deactivated, the energy of the residual magnetic flux is consumed by the resistance of the rotor of the induction motor, and the residual magnetic flux decays in accordance with a time constant determined by the values of resistance and inductance of the induction motor. In the case of an induction motor for railway vehicles, the time constant that determines the decay time of the residual magnetic flux is on the order of 200 to 600 ms.

The time it takes for the residual magnetic flux to decay to zero is approximately three times the time constant (namely, 600 to 1800 ms), considering the fact that the step response of a first-order lag system reaches approximately 95% of a target value in three times the time constant. The time constant with which the residual magnetic flux decays is on an increasing trend because of the increasingly widespread use of induction motors with smaller resistance values as part of the recent energy-saving measures.

While the duration of time for which the railway vehicle is coasted depends on the type of the vehicle and the method of operation, such as whether it is by manual operation or an automatic operation by an ATO (Automatic Train Operation) apparatus, the inverter apparatus may in some cases be restarted by ending the coasting operation before the residual magnetic flux decays to zero.

When the inverter apparatus is started in the state in which the residual magnetic flux remains, excessive current may flow depending on the phase of the induced voltage due to the residual magnetic flux and the voltage outputted from the inverter apparatus. This is not desirable from the viewpoint of protection of the inverter apparatus. This may further lead to transient torque variation, thereby adversely affecting the ride.

When speed sensor-less vector control is implemented such that, instead of detecting the rotation speed of the induction motor by using a speed sensor, the induction motor is driven by estimating the rotation speed from the current flow through the induction motor, speed estimation failure may be caused by the induced voltage as disturbance due to the residual magnetic flux.

The current may be suppressed by controlling the phase of the voltage outputted from the inverter apparatus if the phase of the residual magnetic flux can be accurately grasped. However, the addition of a sensor for detecting the phase of the magnetic flux, for example, results in an increase in manufacturing cost or maintenance cost. Further, when a method of estimating the phase of the magnetic flux is employed, the residual magnetic flux may not be accurately detected because of the influence of manufacturing errors in the resistance value or inductance value of the induction motor, variations in the constant due to temperature shifts and the like.

Because the residual magnetic flux decays in accordance with the time constant determined by the resistance value and inductance value of the induction motor as mentioned above, a method may be employed by which the inverter apparatus is restarted after a sufficient time. This method, however, limits the operation of the inverter apparatus and is therefore not preferable.

For the above reasons, it is preferable that the residual magnetic flux has decayed to zero when the inverter apparatus is restarted. Several methods for causing the decay of the residual magnetic flux have been proposed.

JP Patent Publication (Kokai) No. 2008-113501 A describes a method by which, when deactivating the inverter apparatus, the inverter apparatus is operated for a certain time by switching a voltage command for the inverter apparatus from a normal operation command to a command for causing the decay of the residual magnetic flux.

JP Patent Publication (Kokai) No. H10-66386 A (1998) describes a method by which, when deactivating the inverter apparatus, all of upper arms or lower arms of the inverter apparatus are simultaneously turned on so as to form a short circuit between the inverter apparatus and the induction motor.

SUMMARY

As a method for causing the decay of the residual magnetic flux, the following points need to be considered: (1) no excessive current flows through the inverter apparatus so as to protect the inverter apparatus and prevent torque variation; and (2) the decay of the residual magnetic flux occurs in a short time such that the operation intervals of the inverter apparatus are not affected.

However, by the method according to JP Patent Publication (Kokai) No. 2008-113501 A, the calculation equation for calculating the voltage command for normal operation and the calculation equation for calculating the voltage command for causing the decay of the residual magnetic flux differ, so that the output voltage from the inverter apparatus may become discontinuous upon switching of the voltage command, resulting in an excessive current flow. Further, there is no specific description of the time for operation of the inverter apparatus on the basis of the voltage command for causing the decay of the residual magnetic flux.

By the method according to JP Patent Publication (Kokai) No. H10-66386 A (1998), an induced voltage by the residual magnetic flux is applied to the short circuit between the inverter apparatus and the induction motor, so that excessive current may flow between the inverter apparatus and the induction motor.

In view of the foregoing problems, it is an object of the present invention to cause the decay of the residual magnetic flux of an induction motor without causing an excessive current flow and in a short time.

According to an embodiment, an induction motor drive apparatus continues an operation in which the inverter apparatus is caused to output a zero voltage to the induction motor for a predetermined time before deactivating the operation of the inverter apparatus.

Effects of the Invention

In the induction motor drive apparatus according to the embodiment, the residual magnetic flux of the induction motor can be caused to decay without an excessive current flow and in a short time when the inverter apparatus is deactivated. Thus, the inverter apparatus can be restarted without being affected by the residual magnetic flux.

DETAILED DESCRIPTION

Figure 1:
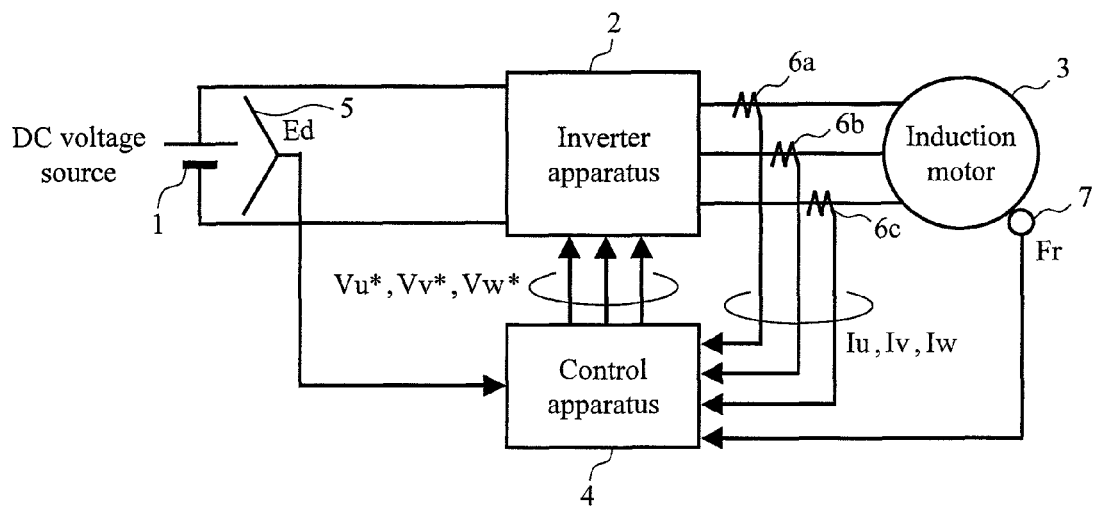
FIG. 1 illustrates a configuration of an induction motor drive apparatus according to an embodiment.

FIG. 1 illustrates a configuration of an induction motor drive apparatus according to an embodiment of the present invention. The drive apparatus according to the embodiment includes an inverter apparatus 2 and a control apparatus 4. The inverter apparatus 2 converts direct-current power obtained from a direct-current voltage source 1 into three-phase alternating-current power and supplies the three-phase alternating-current power to an induction motor 3. The induction motor 3 converts the three-phase alternating-current power obtained from the inverter apparatus 2 into axial torque.

The control apparatus 4 calculates alternating-current voltage commands Vu*, Vv*, and Vw* for the inverter apparatus 2 on the basis of: a voltage Ed of the direct-current voltage source 1 detected by a voltage detection unit 5; alternating-current currents Iu, Iv, and Iw detected by current detection units 6a, 6b, and 6c; and a rotation speed Fr of the induction motor 3 detected by a speed detection unit 7. The control apparatus 4 then outputs the calculated alternating-current voltage commands Vu*, Vv*, and Vw* to the inverter apparatus 2.

For the calculation of the alternating-current voltage commands Vu*, Vv*, and Vw*, vector control is widely used as one of alternating-current electric motor control systems. Vector control is a control scheme in which an orthogonal coordinate system that rotates in synchronism with the magnetic flux in the induction motor is defined, and the induction motor is driven by using a relational equation of current and voltage in the orthogonal coordinate system. Vector control is widely known and thus a detailed description thereof is omitted.

The orthogonal coordinate system used for vector control has a d-axis in the direction of the magnetic flux in the induction motor and a q-axis in the direction perpendicular to the d-axis. When a voltage in the d-axis direction is Vd, a voltage in the q-axis direction is Vq, a current in the d-axis direction is an excitation current Id, and a current in the q-axis direction is a torque current Iq, the relational equation of current and voltage for the induction motor is as follows.

$$\begin{cases} Vd = (R\sigma + s \cdot L\sigma) \cdot Id - 2\pi \cdot Fi \cdot L\sigma \cdot Iq - R2 \cdot \frac{Lm}{L2^2} \cdot \phi d \\ Vq = (R\sigma + s \cdot L\sigma) \cdot Iq + 2\pi \cdot Fi \cdot L\sigma \cdot Id + 2\pi \cdot Fr \cdot \frac{Lm}{L2} \cdot \phi d \\ \phi d = \frac{Lm \cdot Id}{1 + s \cdot T2} \end{cases} \quad \text{Equation 1}$$

where $R\sigma$ is a resistance referred to the primary, $L\sigma$ is a leakage inductance referred to the primary, $L2$ is a secondary self-inductance, $R2$ is a secondary resistance, $Lm$ is a mutual inductance, $T2$ is a secondary time constant, $\phi d$ is a d-axis magnetic flux, $Fi$ is a frequency command, $Fr$ is the rotation speed of the induction motor, and $s$ is a differential operator.

Generally, induction motor control involves the determination of the excitation current Id and the torque current Iq by coordinate transformation of the alternating-current currents Iu, Iv, and Iw and the calculation of a d-axis voltage command Vd* and a q-axis voltage command Vq* according to Equation 1 such that Id and Iq correspond to the respective command values Id* and Iq*. Further, the inverter apparatus is operated by determining the voltage commands Vu*, Vv*, and Vw* through coordinate transformation of Vd* and Vq*.

FIG. 1 is merely an example of the drive apparatus and does not limit the present invention. While in the example of FIG. 1 the single induction motor 3 is driven, a plurality of induction motors may be driven. Further, while three current detection units are illustrated, since the sum of the three-phase alternating-current currents Iu, Iv, and Iw is zero for structural reasons, two current detection units may be installed to detect Iu and Iv and then Iw may be calculated according to the following Equation 2.

$$Iw = -(Iu + Iv) \quad \text{Equation 2}$$

Further, when speed sensor-less vector control is implemented to estimate the rotation speed of the induction motor 3 on the basis of the alternating-current currents Iu, Iv, and Iw, the speed detection unit 7 may be omitted.

In the following, the residual magnetic flux in the case of deactivating the inverter apparatus 2 without using the present embodiment will be described for comparison.

Figure 2:
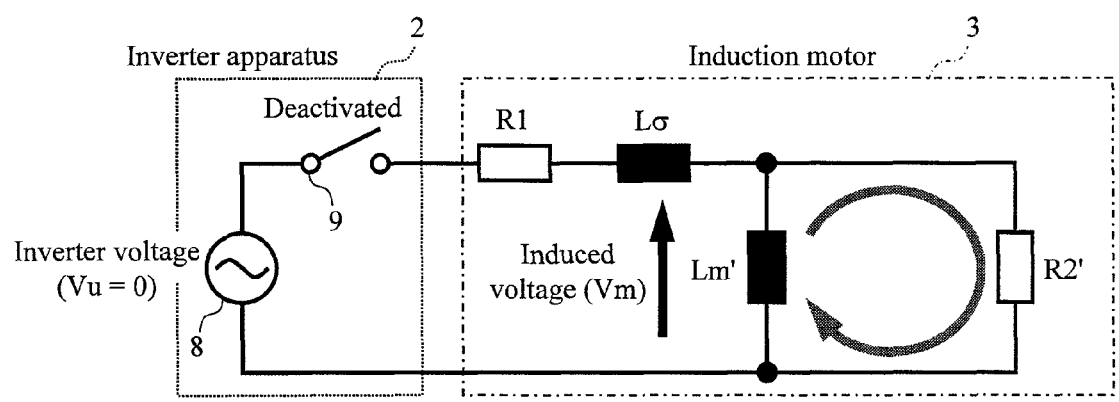
FIG. 2 illustrates an equivalent circuit for one phase of an inverter apparatus 2 and an induction motor 3.

FIG. 2 illustrates an equivalent circuit for one phase of the inverter apparatus 2 and the induction motor 3. FIG. 2 illustrates the state in which the inverter apparatus is deactivated. This state corresponds to the shaded portion of FIG. 3 which will be described later.

Referring to FIG. 2, the inverter apparatus 2 is represented by an alternating-current voltage source 8 that outputs a voltage for the voltage command Vu* outputted from the control apparatus 4, and a switch 9 that is opened or closed in accordance with an operation command to the inverter apparatus 2.

The portion of FIG. 2 enclosed by a dashed-dotted line indicates the equivalent circuit for one phase of the induction motor 3. R1 is a resistance referred to the primary, and La is the leakage inductance referred to the primary. R2' and Lm' are the secondary resistance and the mutual inductance, respectively, referred to the primary, which are expressed by the following Equations 3 and 4.

$$R2' = R2 \cdot \left(\frac{Lm}{L2}\right)^2 \qquad \text{Equation 3}$$

$$Lm' = \frac{Lm^2}{L2} \qquad \text{Equation 4}$$

where L2 is the secondary self-inductance, R2 is the secondary resistance, and Lm is the mutual inductance.

Figure 3:
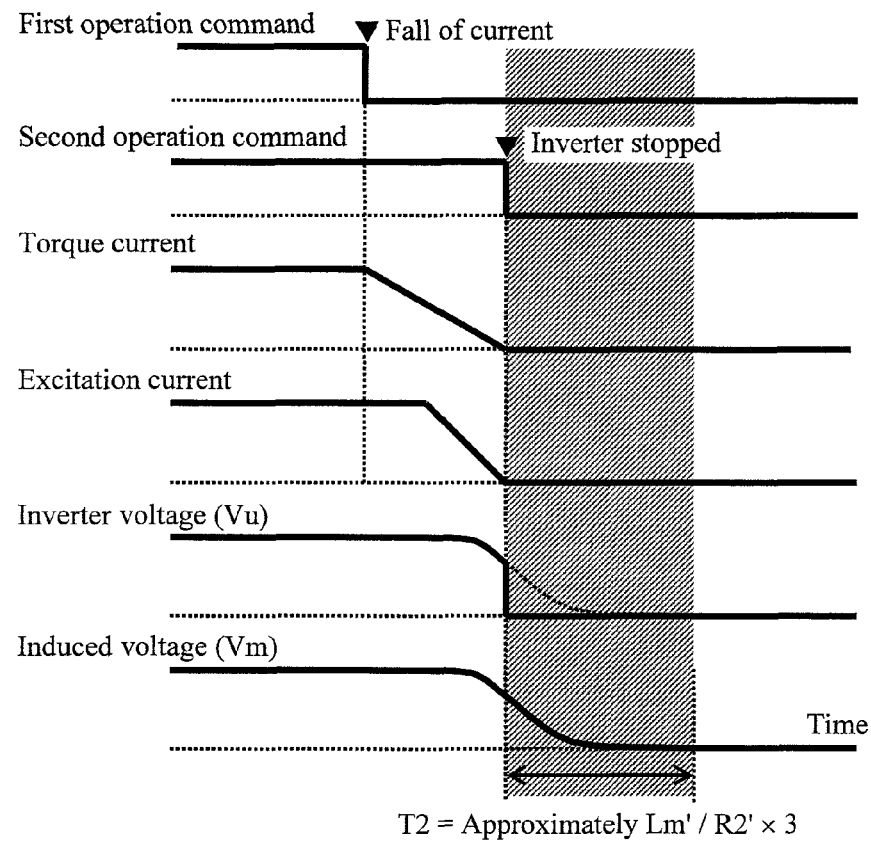
FIG. 3 is a time chart for a conventional operation for deactivating the inverter apparatus 2.

FIG. 3 is a time chart for a conventional operation for deactivating the inverter apparatus 2, indicating, successively from the top, a first operation command, a second operation command, a torque current, an excitation current, a voltage Vu outputted by the inverter apparatus (hereafter referred to as the "inverter voltage"), and an induced voltage Vm in the induction motor. The current that flows in the induction motor 3 is indicated by the excitation current and the torque current on the assumption that the induction motor is driven by vector control.

The first operation command is a command from the control apparatus 4 to the inverter apparatus 2 that indicates the timing for the start of a decrease in the excitation current and the torque current from predetermined values to zero. When the first operation command falls, the respective currents start to be decreased. While in the illustrated example the decrease in the torque current is started first, the torque current and the excitation current may simultaneously start to be decreased, or the start of decrease in the torque current may be delayed as in the excitation current, as long as the currents start to be decreased after the fall of the first operation command.

The second operation command is a command from the control apparatus 4 to the inverter apparatus 2 that indicates the timing for deactivating the inverter apparatus 2. When the second operation command falls, the inverter apparatus 2 is deactivated. The state in which the second operation command is fallen corresponds to the state in which the switch 9 of FIG. 2 is open.

Normally, the inverter apparatus is deactivated after the excitation current and the torque current have decayed to zero. However, because the command Vu* for the inverter voltage Vu is calculated according to Equation 1, it does not immediately become zero due to the remaining term for the d-axis magnetic flux φd even when the excitation current and the torque current have decayed to zero.

The energy of the residual magnetic flux is consumed by the flow of current in the path indicated by an arrow through R2' in FIG. 2 and decays in accordance with a time constant Lm'/R2'=L2/R2=T2. In the case of induction motors for railway vehicles, the time constant T2 is on the order of 200 to 600 ms. In view of the fact that the step response of a first-order lag system reaches approximately 95% of a target value in three times the time constant, it takes approximately three times the time constant T2 (namely, on the order of 600 to 1800 ms) before the residual magnetic flux decays to zero.

Next, the residual magnetic flux in the case where the inverter apparatus 2 is deactivated by the induction motor drive apparatus according to the present embodiment will be described.

Figure 4:
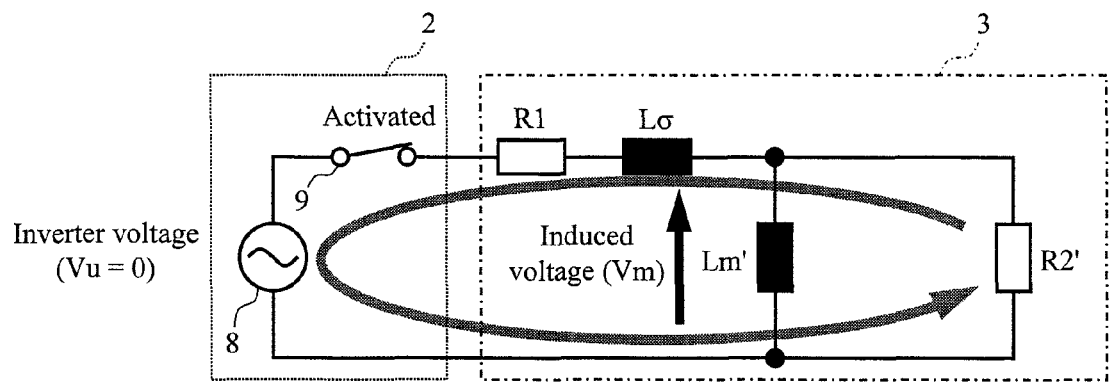
FIG. 4 illustrates an operation of the present embodiment with reference to the equivalent circuit for one phase of the inverter apparatus 2 and the induction motor 3.

FIG. 4 illustrates an operation of the present embodiment with reference to the equivalent circuit for the one phase of the inverter apparatus 2 and the induction motor 3. The reference signs are similar to those of FIG. 2. According to the present embodiment, before the inverter apparatus 2 is deactivated, the inverter apparatus 2 is operated in a state in which the inverter voltage Vu is a zero voltage, the state corresponding to the shaded portion of FIG. 5 as will be described later. The "zero voltage" herein refers to the fact that the effective value of the voltage outputted from the inverter apparatus 2 is zero.

According to the present embodiment, as opposed to FIG. 2, the inverter apparatus 2 outputs the zero voltage before the inverter apparatus 2 is deactivated, so that the energy of the residual magnetic flux is consumed by the flow of current in the path indicated by an arrow in FIG. 4.

In induction motors for railway vehicles, Lσ is on the order of 2 to 3 mH while Lm' is approximately ten times as large, i.e., on the order of 20 to 30 mH. Thus, the portion of FIG. 4 in which Lm' and R2' are connected in parallel may be considered as if only R2' exists. Accordingly, the time constant that determines the time for the decay of the magnetic flux can be approximated by Lσ/(R1+R2')≈Lσ/Rσ=Tσ.

In induction motors for railway vehicles, Tσ is on the order of 10 to 20 ms. Thus, compared with the related art described with reference to FIGS. 2 and 3, the residual magnetic flux of the induction motor 3 can be caused to decay in a short time.

Figure 5:
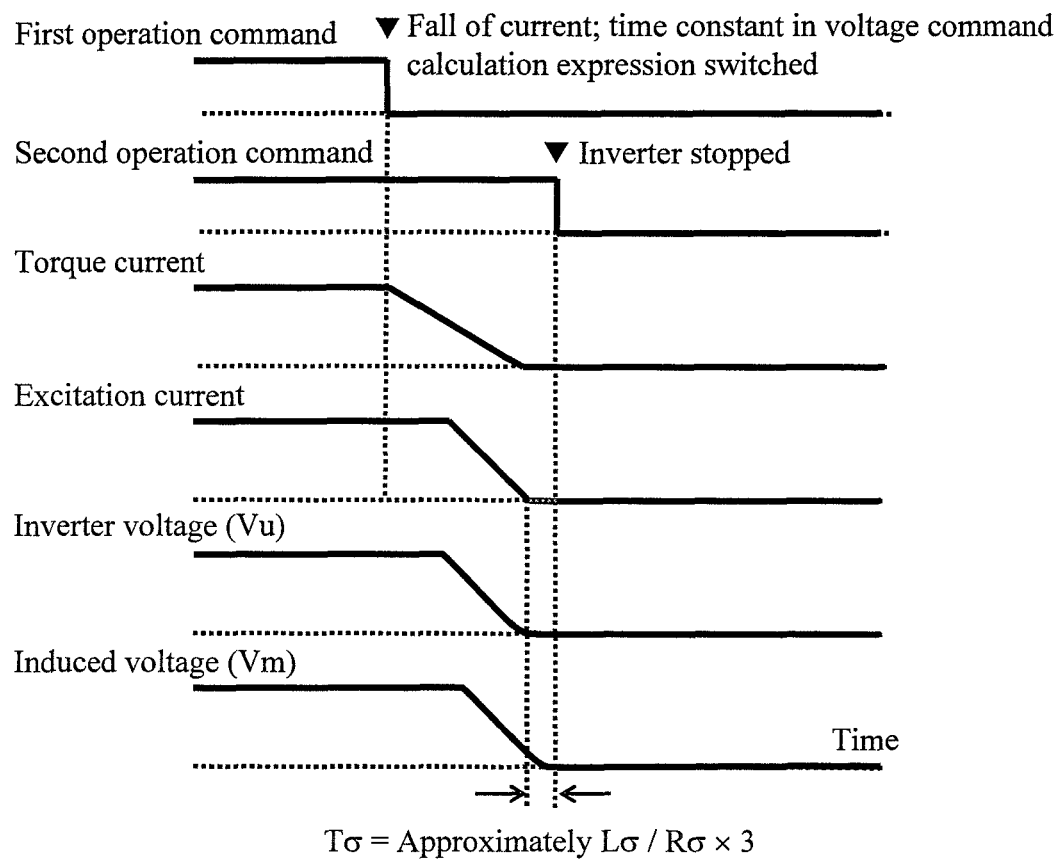
FIG. 5 is a time chart for an operation for deactivating the inverter apparatus 2 according to the present embodiment.

FIG. 5 is a time chart for describing an operation for deactivating the inverter apparatus 2 according to the present embodiment. The types of the signals are similar to those of FIG. 3. According to the present embodiment, the magnetic flux is caused to decay in accordance with the time constant Tσ as described above. Thus, the command Vu* for the inverter voltage Vu is calculated according to the following Equation 5 in which the time constant T2 in the equation for φd in the third line of Equation 1 is switched to Tσ simultaneously with the fall of the first operation command.

$$\begin{cases} Vd = (R\sigma + s \cdot L\sigma) \cdot Id - 2\pi \cdot Fi \cdot L\sigma \cdot Iq - R2 \cdot \dfrac{Lm}{L2^2} \cdot \phi d \\ Vq = (R\sigma + s \cdot L\sigma) \cdot Iq + 2\pi \cdot Fi \cdot L\sigma \cdot Id + 2\pi \cdot Fr \cdot \dfrac{Lm}{L2} \cdot \phi d \\ \phi d = \dfrac{Lm \cdot Id}{1 + s \cdot T\sigma} \end{cases} \quad \text{Equation 5}$$

In this way, the voltage command can be calculated in accordance with the time constant with which the magnetic flux actually decays. Namely, when the first operation command falls, the respective currents start to fall to zero. When the currents are zero, the inverter apparatus 2 outputs the zero voltage for forming the circuit state illustrated in FIG. 4. Thus, in order to form the circuit state illustrated in FIG. 4 as soon after the fall of the first operation command as possible, the time constant is switched at the fall of the first operation command, and the voltage command is calculated in accordance with the time constant after the switching.

By switching the time constant, the induced voltage Vm can be decreased as soon as possible even before the circuit state of FIG. 4 is formed. The equations for calculating the voltage command are common with only the time constant switched from T2 to Tσ, so that the continuity of the voltage command before and after the switching of the time constant is ensured and no excessive current flows.

The time between the start of the output of the zero voltage from the inverter apparatus 4 and the convergence of the residual magnetic flux to zero may be approximately three times the time constant Tσ (=on the order of 10 to 20 ms). Thus, the inverter apparatus 2 may be deactivated by causing the second operation command to fall after at least 30 to 60 ms or more following the convergence of the excitation current and the torque current to zero.

SUMMARY OF THE EMBODIMENT

Thus, in the induction motor drive apparatus according to the present embodiment, the zero voltage is outputted from the inverter apparatus 2 before the inverter apparatus 2 is deactivated, and the residual magnetic flux is caused to decay in accordance with the path illustrated in FIG. 4. In this way, the residual magnetic flux can be caused to decay in a short time.

Further, the induction motor drive apparatus according to the present embodiment causes the inverter apparatus 2 to output the inverter voltage with the effective value of zero, instead of short-circuiting the inverter apparatus 2 and the induction motor. Thus, the residual magnetic flux can be decreased safely without an excessive current flow in the inverter apparatus 2.

While the present invention has been described herein with reference to a preferred embodiment thereof, it should be understood that various changes and modification may be made to the particular examples without departing from the spirit and scope of the present invention.

All or some of the elements, functions, processing units and the like may be designed for an integrated circuit and thereby implemented as hardware, or they may be implemented as software such that a program for implementing the corresponding functions is executed by a processor. The programs for implementing the various functions, information for tables and the like may be stored in a storage apparatus, such as a memory or a hard disk, or a storage medium, such as an IC card or a DVD.

REFERENCE SIGNS LIST

1: Direct-current voltage source
2: Inverter apparatus
3: Induction motor
4: Control apparatus
5: Voltage detection unit
6a to 6c: Current detection units
7: Speed detection unit
8: Alternating-current voltage source
9: Switch

What is claimed is:

1. An induction motor control apparatus for controlling an operation of an induction motor by controlling an operation of an inverter apparatus that converts direct-current power into alternating-current power and supplies the alternating-current power to the induction motor, wherein
   the operation of the inverter apparatus is deactivated after an operation in which the inverter apparatus is caused to output a zero voltage to the induction motor is continued for a predetermined time, such that a magnetic flux in the induction motor is caused to decay before the operation of the inverter apparatus is deactivated,
   in a period before the inverter apparatus is caused to output the zero voltage and before the start of a decrease in a torque current and an excitation current for the induction motor, a voltage command for the inverter apparatus is calculated by using a calculation equation including a time constant calculated from a secondary resistance of the induction motor and a secondary self-inductance of the induction motor as a parameter; and
   in a period after the start of the decrease in the torque current and the excitation current and until the torque current and the excitation current become zero, the time constant included in the calculation equation is changed to a time constant calculated from a resistance value converted to the primary side of the induction motor and a leakage inductance value converted to the primary side of the induction motor.

2. The induction motor control apparatus according to claim 1, wherein the time in which the inverter apparatus outputs the zero voltage is at least three times or more of a primary time constant calculated from a resistance value and an inductance value of the induction motor.

3. The induction motor control apparatus according to claim 1, wherein a voltage command for the inverter apparatus is calculated by using a calculation equation in which a leakage inductance converted to the primary side of the induction motor is set to be smaller than a mutual inductance converted to the primary side of the induction motor.

4. The induction motor control apparatus according to claim 3, wherein the time in which the inverter apparatus outputs the zero voltage is at least three times or more of a primary time constant calculated from a resistance value and an inductance value of the induction motor.

5. The induction motor control apparatus according to claim 3, wherein the voltage command for the inverter apparatus is further calculated by using a calculation equation in which the time constant in the period before the inverter apparatus is caused to output the zero voltage and before the start of a decrease in a torque current and an excitation current for the induction motor is set to be greater than the time constant in the period after the start of the decrease in the torque current and the excitation current and until the torque current and the excitation current become zero.

6. The induction motor control apparatus according to claim 3, wherein in the period before the inverter apparatus is caused to output the zero voltage and before the start of a decrease in a torque current and an excitation current for the induction motor, the voltage command for the inverter apparatus is calculated according to the following Equation 1, and
   in the period after the start of the decrease in the torque current and the excitation current and until the torque current and the excitation current become zero, the voltage command for the inverter apparatus is calculated according to the following Equation 5,
   wherein Vd represents a voltage in a d-axis direction, Vq represents a voltage in a q-axis direction, Id represents the excitation current, Iq represents the torque current, Rσ represents the resistance value converted to the primary side of the induction motor, Lσ represents the leakage inductance value converted to the primary side of the induction motor, R2 represents the secondary resistance, L2 represents the secondary self-inductance, Lm represents the mutual inductance, 72 represents the time constant calculated from the secondary resistance of the induction motor, Tσ represents the time constant calculated from the resistance value converted to the primary side of the induction motor, Φd represents a d-axis magnetic flux, Fi represents a frequency command, Fr represents a rotation speed of the induction motor, and s represents a differential operator, $$\begin{cases} Vd = (R\sigma + s \cdot L\sigma) \cdot Id - 2\pi \cdot Fi \cdot L\sigma \cdot Iq - R2 \cdot \dfrac{Lm}{L2^2} \cdot \phi d \\ Vq = (R\sigma + s \cdot L\sigma) \cdot Iq + 2\pi \cdot Fi \cdot L\sigma \cdot Id + 2\pi \cdot Fr \cdot \dfrac{Lm}{L2} \cdot \phi d \\ \phi d = \dfrac{Lm \cdot Id}{1 + s \cdot T2} \end{cases} \quad \text{Equation 1}$$

-continued $$\begin{cases} Vd = (R\sigma + s \cdot L\sigma) \cdot Id - 2\pi \cdot Fi \cdot L\sigma \cdot Iq - R2 \cdot \dfrac{Lm}{L2^2} \cdot \phi d \\ Vq = (R\sigma + s \cdot L\sigma) \cdot Iq + 2\pi \cdot Fi \cdot L\sigma \cdot Id + 2\pi \cdot Fr \cdot \dfrac{Lm}{L2} \cdot \phi d \\ \phi d = \dfrac{Lm \cdot Id}{1 + s \cdot T\sigma}. \end{cases} \quad \text{Equation 5}$$

7. The induction motor control apparatus according to claim 1, wherein a voltage command for the inverter apparatus is calculated by using a calculation equation in which the time constant in the period before the inverter apparatus is caused to output the zero voltage and before the start of a decrease in a torque current and an excitation current for the induction motor is set to be greater than the time constant in the period after the start of the decrease in the torque current and the excitation current and until the torque current and the excitation current become zero.

8. The induction motor control apparatus according to claim 7, wherein the time in which the inverter apparatus outputs the zero voltage is at least three times or more of a primary time constant calculated from a resistance value and an inductance value of the induction motor.

9. The induction motor control apparatus according to claim 7, wherein in the period before the inverter apparatus is caused to output the zero voltage and before the start of a decrease in a torque current and an excitation current for the induction motor, the voltage command for the inverter apparatus is calculated according to the following Equation 1, and in the period after the start of the decrease in the torque current and the excitation current and until the torque current and the excitation current become zero, the voltage command for the inverter apparatus is calculated according to the following Equation 5, wherein Vd represents a voltage in a d-axis direction, Vq represents a voltage in a q-axis direction, Id represents the excitation current, Iq represents the torque current, Rσ represents the resistance value converted to the primary side of the induction motor, Lσ represents the leakage inductance value converted to the primary side of the induction motor, R2 represents the secondary resistance, L2 represents the secondary self-inductance, Lm represents the mutual inductance, T2 represents the time constant calculated from the secondary resistance of the induction motor, Tσ represents the time constant calculated from the resistance value converted to the primary side of the induction motor, Φd represents a d-axis magnetic flux, Fi represents a frequency command, Fr represents a rotation speed of the induction motor, and s represents a differential operator, $$\begin{cases} Vd = (R\sigma + s \cdot L\sigma) \cdot Id - 2\pi \cdot Fi \cdot L\sigma \cdot Iq - R2 \cdot \dfrac{Lm}{L2^2} \cdot \phi d \\ Vq = (R\sigma + s \cdot L\sigma) \cdot Iq + 2\pi \cdot Fi \cdot L\sigma \cdot Id + 2\pi \cdot Fr \cdot \dfrac{Lm}{L2} \cdot \phi d \\ \phi d = \dfrac{Lm \cdot Id}{1 + s \cdot T2} \end{cases} \quad \text{Equation 1}$$

10. The induction motor control apparatus according to claim 1, wherein in the period before the inverter apparatus is caused to output the zero voltage and before the start of a decrease in a torque current and an excitation current for the induction motor, the voltage command for the inverter apparatus is calculated according to the following Equation 1, and in the period after the start of the decrease in the torque current and the excitation current and until the torque current and the excitation current become zero, the voltage command for the inverter apparatus is calculated according to the following Equation 5, wherein Vd represents a voltage in a d-axis direction, Vq represents a voltage in a q-axis direction, Id represents the excitation current, Iq represents the torque current, Rσ represents the resistance value converted to the primary side of the induction motor, Lσ represents the leakage inductance value converted to the primary side of the induction motor, R2 represents the secondary resistance, L2 represents the secondary self-inductance, Lm represents the mutual inductance, T2 represents the time constant calculated from the secondary resistance of the induction motor, Tσ represents the time constant calculated from the resistance value converted to the primary side of the induction motor, Φd represents a d-axis magnetic flux, Fi represents a frequency command, Fr represents a rotation speed of the induction motor, and s represents a differential operator, $$\begin{cases} Vd = (R\sigma + s \cdot L\sigma) \cdot Id - 2\pi \cdot Fi \cdot L\sigma \cdot Iq - R2 \cdot \dfrac{Lm}{L2^2} \cdot \phi d \\ Vq = (R\sigma + s \cdot L\sigma) \cdot Iq + 2\pi \cdot Fi \cdot L\sigma \cdot Id + 2\pi \cdot Fr \cdot \dfrac{Lm}{L2} \cdot \phi d \\ \phi d = \dfrac{Lm \cdot Id}{1 + s \cdot T2} \end{cases} \quad \text{Equation 1}$$

$$\begin{cases} Vd = (R\sigma + s \cdot L\sigma) \cdot Id - 2\pi \cdot Fi \cdot L\sigma \cdot Iq - R2 \cdot \dfrac{Lm}{L2^2} \cdot \phi d \\ Vq = (R\sigma + s \cdot L\sigma) \cdot Iq + 2\pi \cdot Fi \cdot L\sigma \cdot Id + 2\pi \cdot Fr \cdot \dfrac{Lm}{L2} \cdot \phi d \\ \phi d = \dfrac{Lm \cdot Id}{1 + s \cdot T\sigma}. \end{cases} \quad \text{Equation 5}$$

11. The induction motor control apparatus according to claim 10, wherein the time in which the inverter apparatus outputs the zero voltage is at least three times or more of a primary time constant calculated from a resistance value and an inductance value of the induction motor.

* * * * *